United States Patent [19]
Wakeman

[11] 3,910,177
[45] Oct. 7, 1975

[54] APPARATUS FOR MAKING DOUGH FOR YEAST-RAISED BAKERY PRODUCTS

[75] Inventor: Alden H. Wakeman, Lake Mills, Wis.

[73] Assignee: Crepaco, Inc., Chicago, Ill.

[22] Filed: Sept. 4, 1973

[21] Appl. No.: 393,749

[52] U.S. Cl. .................................. 99/483; 134/69
[51] Int. Cl.² .............................................. A21C 1/0
[58] Field of Search ..................... 99/483, 276–277, 99/277.2, 324, 352, 359–360, 403–404, 409, 443; 134/69, 78–79, 104–105, 153; 259/9–10, 25–26, 45–46, DIG. 18

[56] References Cited
UNITED STATES PATENTS

| | | | |
|---|---|---|---|
| 1,700,510 | 1/1929 | Oches | 259/9 |
| 1,942,538 | 1/1934 | Cutler | 134/78 |
| 2,005,996 | 6/1935 | Kraft | 259/DIG. 18 |
| 2,118,616 | 5/1938 | McConnaughay | 259/9 |
| 2,675,011 | 4/1954 | Maddaford | 134/79 |
| 2,774,577 | 12/1956 | Anderson et al. | 259/9 |
| 2,840,356 | 6/1958 | Wills | 259/DIG. 18 |
| 3,722,401 | 3/1973 | Davidson | 134/105 X |
| 3,725,013 | 4/1973 | Kavepa et al. | 259/9 X |
| 3,751,010 | 8/1973 | Latinen | 259/9 |

*Primary Examiner*—Harvey C. Hornsby
*Assistant Examiner*—Arthur O. Henderson

[57] ABSTRACT

A process and an apparatus for making dough for yeast-raised bakery products are provided wherein a fermentable mixture while fermenting is continuously moved at a predetermined flow rate through an elongated chamber and simultaneously therewith the density of the fermenting mixture at any cross-section taken transversely of the axis of the chamber is substantially uniformly maintained throughout.

9 Claims, 9 Drawing Figures

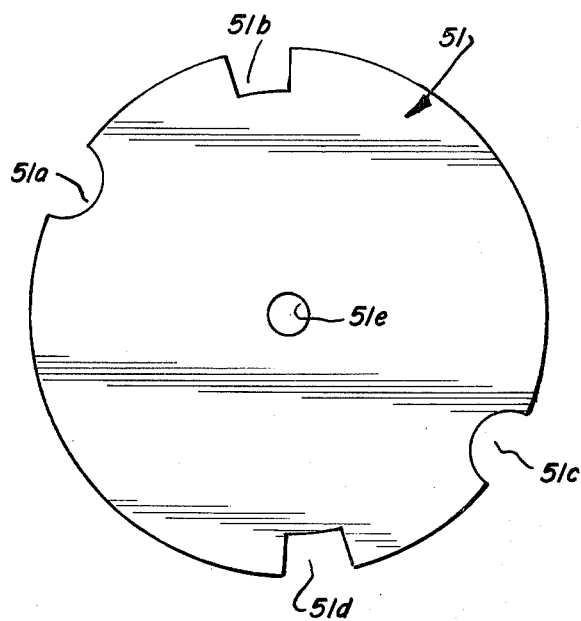
FIG. 6
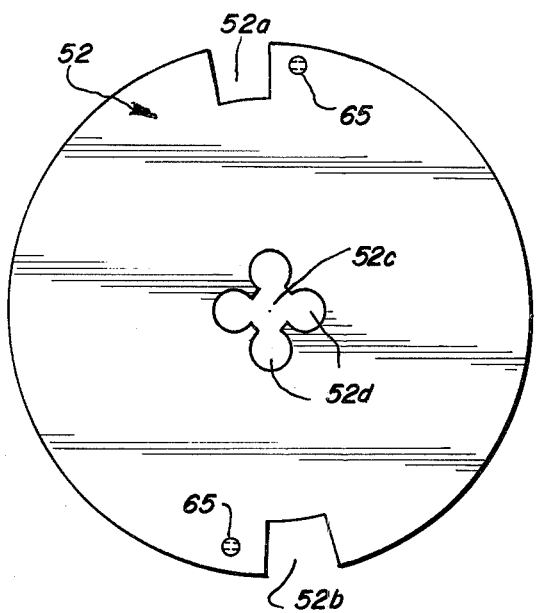
FIG. 7
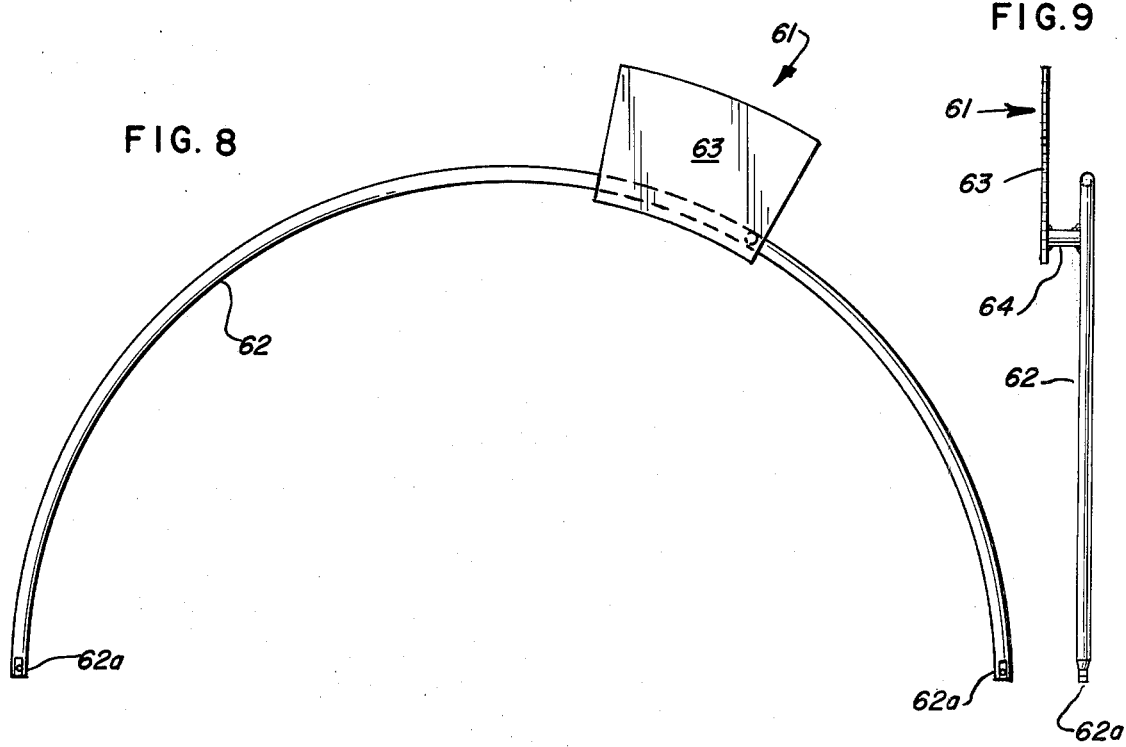
FIG. 8
FIG. 9

APPARATUS FOR MAKING DOUGH FOR YEAST-RAISED BAKERY PRODUCTS

BACKGROUND OF THE INVENTION

Various processes utilizing liquid ferments have heretofore been utilized in the commercial production of dough for yeast raised bakery products such as bread and buns. Such prior processes have normally been either the straight dough type or the sponge dough type. In the straight dough process all of the required ingredients for the finished dough are mixed together at one time to form a fermentable mass. Fermentation of the mass takes place for a prolonged period of time while the mass remains in a substantially quiescent state.

In the sponge dough process, on the other hand, only a predetermined portion of the required dry flour is mixed with a slurry containing yeast and other ingredients to form a fermentable mixture which upon fermentation becomes a sponge-like mass. Subsequently, the balance of the required dry flour is added to the sponge-like mass to form the finished dough.

While the sponge dough process has been found to be particularly suitable where continuous making of substantial quantities of finished dough is required, nevertheless it has been beset with certain serious shortcomings. For example, where batch-type fermenting tanks are utilized, it has been found that certain portions of the fermenting mixture will remain in the tanks a substantially greater (4½ hrs.) period of time than other portions with the result that the viscosity of the sponge-like mass will vary substantially, thereby complicating the controlled operation of the various apparatus subsequently utilized in practicing the balance of the process. In other prior sponge dough processes utilizing flow-through fermenting tanks, there has been a problem in preventing portions of the fermenting mixture by-passing certain segments of the tanks thereby resulting in said portions remaining in the tanks for a period substantially less than required.

Heretofore, in practicing either process, the equipment required was bulky and costly and necessitated substantial floor space. Furthermore, difficulty was often encountered in maintaining such equipment in such condition so as to comply with stringent sanitary requirements.

SUMMARY OF THE INVENTION

Thus, it is an object of the invention to provide a process of making dough for yeast-raised bakery products which provides effective control of the density of the fermentable mixture during fermentation thereof.

It is a further object of the invention to provide a process for making dough for yeast-raised bakery products which requires substantially less time, and is readily capable of accepting a variety of dough formulations.

It is a further object of the invention to provide a process which utilizes a flow-through type of fermenter requiring a substantially smaller amount of floor space without sacrificing the quantity and quality of the finished dough produced.

It is a further object of the invention to provide a process of the type described wherein the output thereof may be readily adjusted to meet varying product demands.

It is a still further object of the invention to provide an elongated fermentation apparatus which utilizes the first-in/first-out concept and causes the fermentable mixture, while passing therethrough, to slowly and continuously turn over so that a substantial amount of the gas formed within the mixture will be readily expelled out through venting means provided on the apparatus and thus the density of the sponge dough discharged from the apparatus can be effectively controlled.

It is a still further object of the invention to provide a fermentation apparatus having means wherein said apparatus is capable of being effectively and expeditiously cleaned in place when required.

Further and additional objects will appear from the description, accompanying drawings and appended claims.

In accordance with one embodiment of the invention, a fermentation apparatus is provided having an elongated chamber through which a fermentable mixture is caused to continuously flow. The chamber is provided with means for venting a substantial amount of the gas produced during fermentation of the mixture. Rotatably mounted within the chamber is an elongated reel assembly which is driven so as to effect a continuous slow turn-over of the fermenting mixture while it is passing through the chamber and cause a substantial amount of the gas entrapped within the turned-over mixture to be expelled therefrom through the venting means.

DESCRIPTION

For a more complete understanding of the invention, reference should be made to the drawings wherein:

FIGS. 6 and 7 are front elevational views of adjacent partitions forming components of the reel assembly;

FIG. 8 is an enlarged front elevational view of one of the complemental sections comprising a gate valve which is another component of the reel assembly and is adjustably mounted adjacent the partition shown in FIG. 7; and FIG. 9 is a right side elevational view of the gate valve section of FIG. 8.

Figure 1:
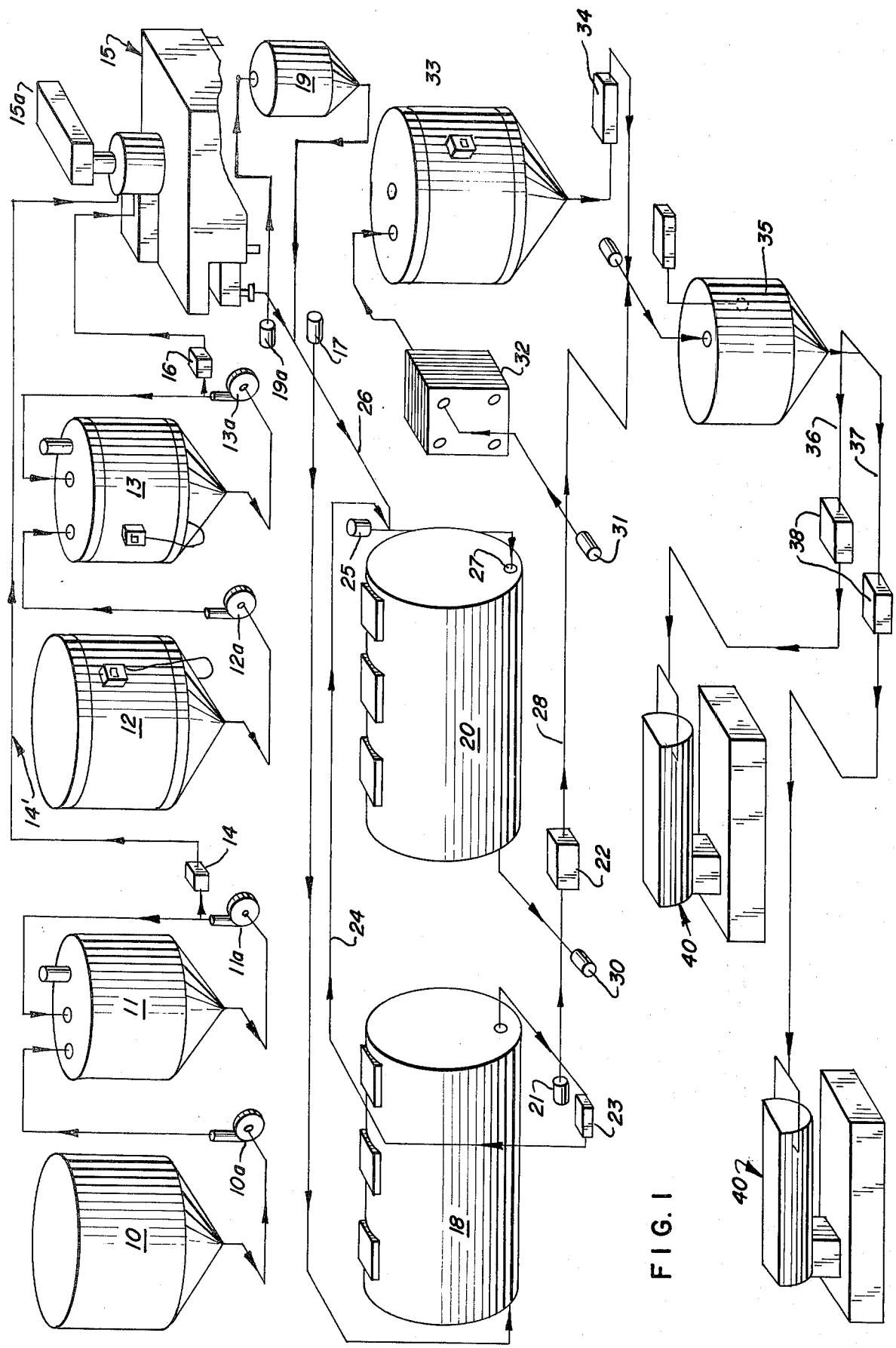
FIG. 1 is a flow diagram of one form of the improved process.

Referring now to the drawings and more particularly to FIG. 1, a commercial process for the continuous making of dough for yeast-raised bakery products is shown diagrammatically. The illustrated process is known as a "sponge dough" process as opposed to the "straight dough" process. In the latter process, all of the necessary ingredients are mixed together in one operation to form a dough. The dough is then permitted to rise for a prescribed period of 3–4 hours before the risen dough is divided, rounded, proofed, moulded, panned, pan-proofed, baked and cooled. The total time expended in the straight dough process is 6–8 hours.

By way of contrast with the improved sponge dough process, a portion (50–70%) of the required dry flour is initially mixed with a slurry containing yeast and other ingredients to form a flowable fermentable mixture. The fermentable mixture during fermentation thereof and while being slowly turned over flows continuously through an elongated chamber. Upon leaving the chamber the fermented mixture is in the form of a flowable sponge-like product with the density thereof being substantially uniform. Subsequently, the balance of the required dry flour is mixed with the sponge-like product to form the finished dough for the desired bakery product.

Various apparatus utilized in practicing the improved sponge dough process are shown in FIG. 1 and comprise a salt slurry mix tank 10, a salt slurry hold tank 11, a yeast slurry mix tank 12 and a yeast slurry hold tank 13. These tanks are of conventional construction, each having a funnel-shaped bottom from which the slurry is withdrawn by a suitable pump 10a, 11a, 12a or 13a. The discharge from the salt slurry tank 11 is regulated by a valve 14. When the valve is in a closed position, the salt slurry will be recirculated through tank 11. On the other hand, when the valve is open, a portion of the slurry is directed to an incorporator 15 through suitable piping 14'.

In a similar manner, the discharge from the yeast slurry hold tank 13 is regulated by a valve 16.

The incorporator 15 is of conventional design and includes a dry flour inlet 15a which permits a predetermined amount (normally 50–70%) of the total dry flour required in the finished dough to be mixed with the slurries from tanks 11 and 13 to form a flowable fermentable mixture. Additional ingredients such as sugar, milk solids, mold inhibitors, etc., are combined by the incorporator with the slurries and dry flour.

From the incorporator 15 the fermentable mixture is metered and may be pumped directly to a remotely controlled first diverter valve 17 which in turn directs the flow of the mixture to either one of two fermenters 18 and 20. If desired, however, the fermentable mixture upon leaving the incorporator may flow to a small pressured tank 19 wherein the mixture is held for a period of approximately 20–30 minutes before it continues on to the first diverter valve 17. During such a period the yeast begins to grow and expel gas. An auxiliary diverter valve 19a controls the flow of the fermentable mixture to tank 19. The tank 19 is of simpler, less costly construction than the fermenters 18 and 20 and can increase the capacity of the system by approximately 15%.

The fermenters 18 and 20, which will be described more fully hereinafter, are preferably of similar construction but may differ in size so that the holding time of the fermenting mixture continuously moving therethrough will be different in order to achieve the same amount of fermentation. For example, tank 18 may have a maximum flow rate of 10,000 pounds per hour while fermenter 20 may have a maximum flow rate of 7,000 pounds per hour. Thus, depending upon the setting of valve 17, the amount of mixture which will be fermented may be varied.

The discharge from fermenter 18 flows through a second remotely controlled diverter valve 21, which, when in one position of adjustment, causes the discharged fermented mixture, now transformed into a flowable sponge-like product, to flow through a positive pump 22 and, thus by-pass fermenter 20. When valve 21 is in a second position of adjustment, the flow of the sponge-like product is to the second fermenter 20. A positive pump 23 is disposed within the piping 24 connecting the two fermenters. Piping 24 also includes a third remotely controlled two way diverter valve 25 which is located at the juncture of the piping 26 leading from the first diverter valve 17 to the inlet 27 of fermenter 20. The operation of the diverter valves 17, 21 and 25 are coordinated so that when the flow is from valve 17 to tank 20, there is no flow through tank 18.

The discharged sponge-like product from tank 20 flows through piping 28 to a remotely operated control valve 30 which is located upstream of a pump 22. A second remotely operated two-way valve 31 is located in piping 28 downstream of pump 22. If, for any reason, the discharged sponge-like product is not to be further processed immediately, the flow in piping 28 is diverted by valve 31 to a heat exchanger 32 wherein the temperature of the sponge-like product is cooled sufficiently so as to inhibit further yeast activation within the product. Once the product has been cooled sufficiently (e.g., from 90°F to 45°F) by the heat exchanger, the product is temporarily accumulated within a suitable cold hold tank 33 wherein the temperature of the cooled product will remain substantially constant until it is withdrawn therefrom by pump 34 for further processing.

When, however, there is to be no interruption in the processing of the sponge-like product, valve 31 will not divert the flow in piping 28 but instead will have the product continue to a weigher tank 35 of conventional design. From tank 35 the sponge-like product is directed to two feed lines 36 and 37, each having a pump 38 for moving the sponge-like product to a mixer 40, also of conventional design. At the mixer, the remainder of the required dry flour is mixed with the sponge-like product to form the finished dough for the desired bakery product.

The capacity of either fermenter 18 or 20 can be reduced to approximately one-half by reducing the amount of product infeed. Thus, in such a situation, the output of tank 18 may be reduced to 5,000 pounds per hour or the output of tank 20 may be reduced to 3,500 pounds per hour. Thus, by proper control of the diverter and metering valves, the quantity of finished dough capable of being produced with the illustrated process may vary from 3,500 pounds per hour to 17,000 pounds per hour. The time for producing the finished dough is approximately 2½ hours.

In instances where there has been preactivation of the yeast within the slurry prior to the latter being mixed by the incorporator 15 with a portion of the required dry flour or where the fermenting mixture discharged from the incorporator 15 has been diverted to the temporary hold tank 19, the amount of time required for fermentation of the mixture within the fermenter to form a sponge-like product may be substantially reduced.

The fermenters or fermentation apparatus 18 and 20, as aforementioned, utilize the first-in/first-out concept and may be of like construction and differ only in their overall lengths. For this reason, therefore, only fermenter 18 will be described in detail. The fermenter includes an elongated tank or chamber 41 which is normally stainless steel or some other suitable material which will not deleteriously affect the fermenting mixture flowing therethrough. The tank is supported by a suitable frame or pedestal 42 which, in turn, is provided with a plurality of vertically adjustable legs 42a. It is important that the tank be positioned so as to have a slight pitch towards the discharge end thereof to facilitate final draining of the tank when it is being cleaned, as will be described more fully hereinafter. An inlet port 43 is provided at the lower portion of one end of the tank and an outlet port 44 is provided in a similar location at the opposite or discharge end of said tank, see FIG. 2. Each port is provided with suitable external fittings for connecting piping thereto.

Formed on the upper side of the tank are a plurality of elongated, longitudinally spaced inspection openings 45, each being provided with a suitable cover having vents formed therein, not shown. During normal operation of the fermenter, the covers assume a closed position but nonetheless a substantial portion of the gas produced during fermentation of the flowing mixture will be expelled through the cover vents. When the covers are open, the flowing mixture within the tank can be readily observed.

Figure 2:
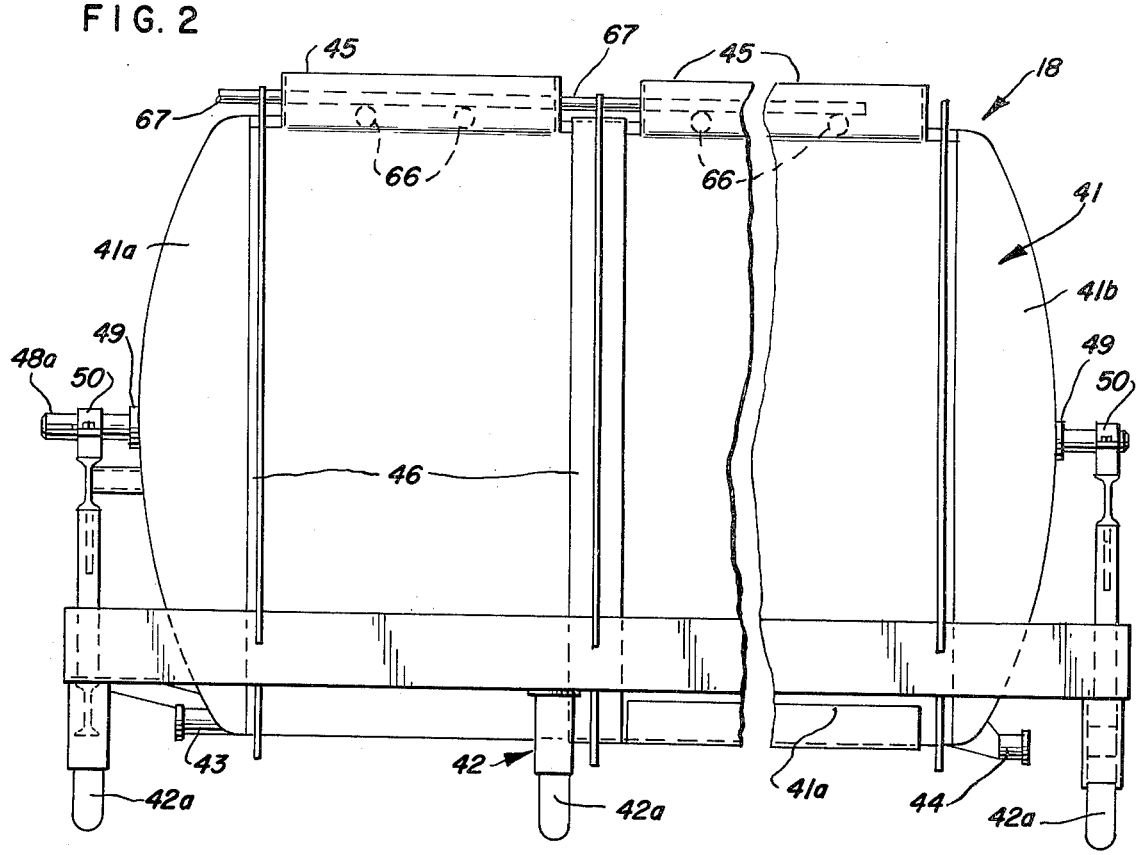
FIG. 2 is a side elevational view of one form of the fermentation apparatus utilized in practicing the process of FIG. 1.

The downstream one-third or one-half of the tank 41 may be partially encompassed by a cooling jacket 41a, see FIG. 2, through which a liquid coolant may be circulated in the event the ferment and/or ambient temperature exceeds a predetermined amount such as, for example, 90°F. It is desirable that the temperature of the sponge-like product discharged through port 44 have a temperature not exceeding 90°F.

The exterior of the tank 41 may be reinforced by a plurality of encompassing ribs or struts 46.

Figure 5:
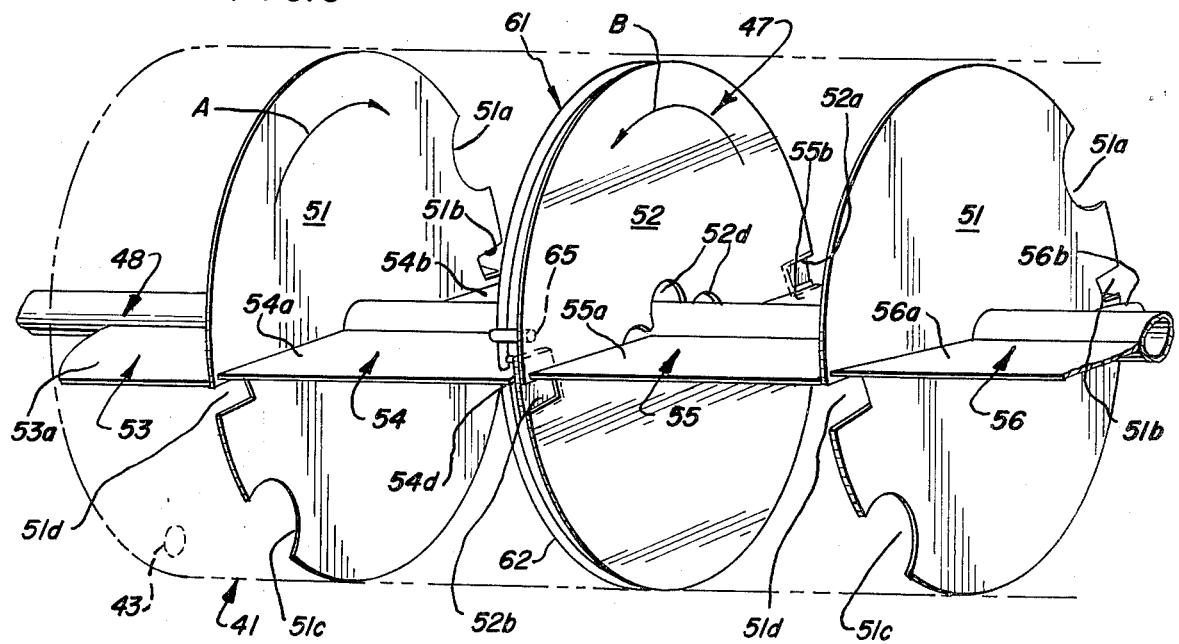
FIG. 5 is a fragmentary perspective view of the reel assembly of FIG. 3 and showing the elongated chamber therefor in phantom lines.

Rotatably mounted within the tank is a reel assembly 47 which may be of a type shown in FIG. 5. The assembly includes an elongated shaft 48 supported at its ends by suitable exterior bearings 50 mounted on the frame or pedestal 42. Rotary seals 49 are carried on the tank end walls 41a and b through which the ends of the shaft 48 extend. At least one end 48a of the shaft is exposed and may be connected by suitable means to a power source, not shown, which will impart a continuous, slow uniform rotation to the reel assembly. The rotational speed of the reel assembly is preferably 0.2 to 1.0 rpm so that the outer peripheral speed of the assembly will be approximately 10 feet per minute.

Figure 3:
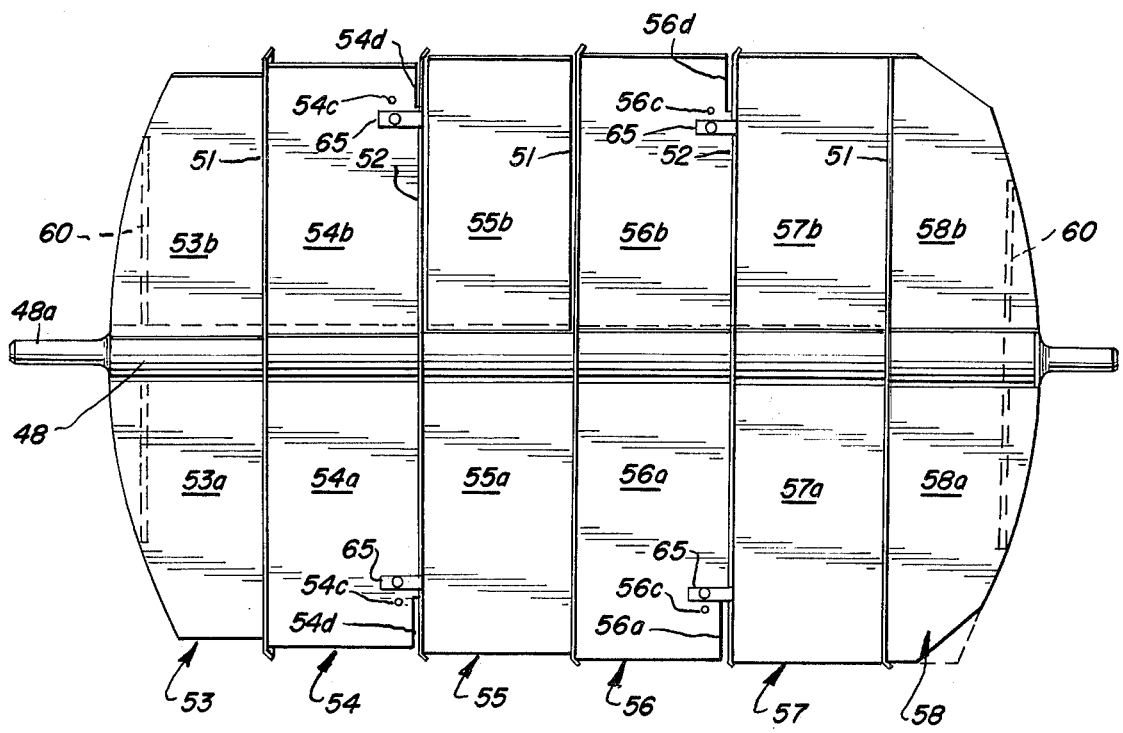
FIG. 3 is a side elevational view of the reel assembly comprising a component of the apparatus of FIG. 2.

Arranged in longitudinally spaced relation along shaft 48 are a plurality of two types of annular partitions 51 and 52 which are disposed in alternate relation. The number of partitions comprising the reel assembly will depend upon the size tank in which the assembly is disposed. In FIG. 3 five partitions are shown arranged in equally spaced relation with the end partitions, in turn, being equally spaced from the end walls of the tank. The illustrated tank may have a length of approximately 9 feet and an internal diameter of approximately 6 feet.

Partition 51, as seen more clearly in FIG. 6, has an outside diameter which closely approximates the internal diameter of the tank 41, thus restricting flow of the fermentable mixture only through predetermined openings 51a, 51b, 51c and 51d formed in the periphery of the partition. Openings 51a and 51c may be of semi-circular configuration and disposed in diametrically opposed relation. Openings 51b and 51d, on the other hand, may have a polygonal configuration and disposed in diametrically opposed relation. The pairs of openings are arranged in annularly spaced relation. A central opening 51e is also provided in partition 51 to accommodate shaft 48.

Partition 52, as seen in FIG. 7, has an outside diameter similar to that of partition 51 and is provided with a single pair of diametrically opposed peripheral openings 52a and 52b, each having a configuration closely approximating that of partition openings 51b and 51d. A central opening 52c is provided in partition 52 to accommodate shaft 48; however, said central opening in the illustrated embodiment has a substantially four-leaf clover configuration so that when the shaft 48 extends through the opening, four symmetrically arranged similar openings 52d will be formed about the shaft exterior, see FIG. 5. Aside from the openings, aforenoted, both partitions 51 and 52 are of imperforate construction.

The partitions 51 and 52 are maintained in properly spaced relation to one another and the end partitions maintained in properly spaced relation to the end walls 41a and 41b of the tank by a plurality of a shelf members 53, 54, 55, 56, 57 and 58, see FIGS. 3 and 5. The partitions and shelf members cooperate with one another and with the tank interior walls to form a plurality of compartments through which the mixture is caused to successively pass during fermentation thereof. Each shelf member, in the illustrated embodiment, includes diametrically opposed sections 53a and b, 54a and b, 55a and b, 56a and b, 57a and b, and 58a and b which extend radially outwardly from the shaft 48. In the case of shelf members 53 and 58, each section thereof is substantially planar and the complemental sections are preferably coplanar and include the axis of shaft 48. Each shelf member 53 or 58 spans the distance between the adjacent tank end wall and the endmost partition. If desired, the sections 53a and b and 58a and b may be reinforced by transversely extending struts 60, see FIG. 3.

Figure 4:
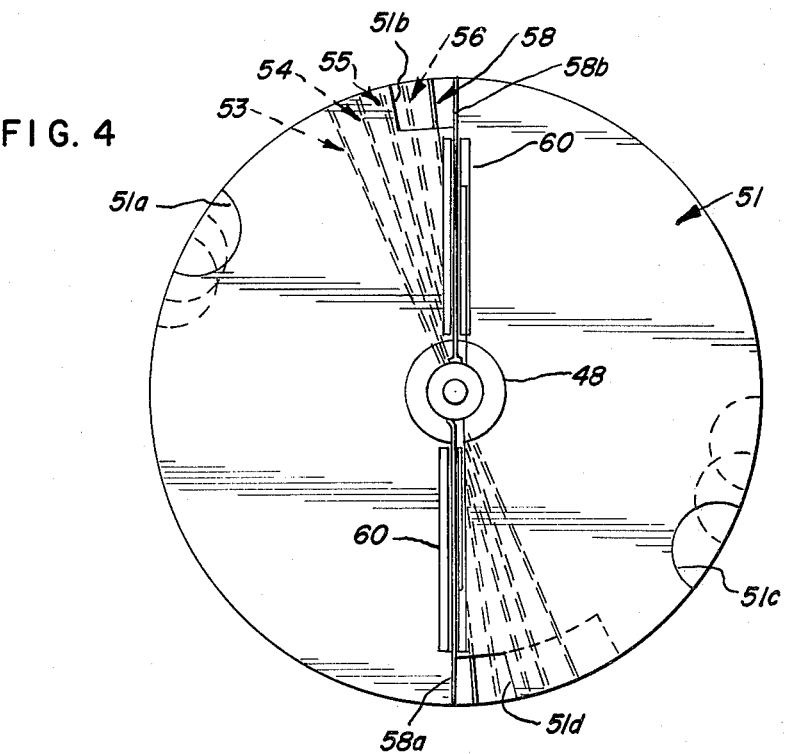
FIG. 4 is a right end view of the reel assembly of FIG. 3.

Each complemental member section is substantially imperforate and has the outer edge thereof terminating adjacent the tank interior wall surface. As will be noted in FIGS. 4 and 5, each successive shelf-like member, starting with member 53, is angularly offset an increasing amount relative to the axis of shaft 48 so that the members are disposed in a uniformly stepped relation.

The fermentable mixture enters the tank through port 43 and due to the pressure differential between ports 43 and 44 will flow towards the discharge port 44 through the peripheral openings 51a–d of partitions 51 and the central openings 51d of partitions 52, as the reel assembly is rotated in a clockwise direction A, as seen in FIG. 5.

When the process is shut down in order to permit the various pieces of equipment to be cleaned, the reel assembly is rotated in a counter-clockwise direction B, see FIG. 5, and the flow of the mixture within the tank will be in the same direction as previously described except that the peripheral openings 52a and b of partitions 52 will be automatically uncovered permitting flow therethrough as well. In certain constructions, however, it might be more desirable to have the openings 52a and b manually uncovered rather than automatically uncovered as previously described. The stepped arrangement of the shelf members comprising the reel assembly will facilitate drainage of the mixture out through port 44. Without such a stepped arrangement it would be extremely difficult, if not impossible, to unload the tank particularly when the level of the mixture within the tank is below the axis of shaft 48. By having the peripheral openings 52a and b uncovered, no flowable mixture will become trapped adjacent the outer periphery of any of the partitions 52.

As the reel assembly is rotated in direction A, the fermenting mixture within the tank will be slowly and gently turned over and over by the shelf members as the mixture flows through successive compartments past the partitions. As the mixture is turned over, some of the gas formed within the fermenting mixture will go to the top of the mixture and be expelled out through the openings 45 formed in the upper portion of the tank. Coupled with the gentle turn over or folding action caused by the shelf members, the flowing fermenting mixture is caused to follow a tortuous path through the tank and as a result thereof, the time an increment of the fermenting mixture is disposed within the tank will normally be approximately two and one-half hours. As aforementioned, where the fermentable mixture has been held in tank 19 for a short period of time so that there has been preactivation of the yeast within the slurry, the flow rate of the mixture through the fermenter can be increased thereby markedly reducing the time required to properly ferment the mixture within the tank 41.

As aforementioned, the peripheral openings 52a and b of the partitions 52 are closed during normal operation of the reel assembly and this is accomplished by gate valves 61 which are rotatably mounted adjacent the upstream surfaces of the partitions 52. As seen more clearly in FIGS. 8 and 9, each gate valve includes a pair of like complemental sections 61a only one being shown in FIGS. 8 and 9. Each section comprises an elongated rod 62 shaped to form a semicircle. The opposite ends 62a of the rod are adapted to be connected to corresponding ends of the other section so that the two section rods delimit a complete circle. The section rod is adapted to slidably fit within an aperture 54c or 56c formed in shelf members 54 and 56, respectively, see FIG. 3. Carried by the rod 62 is a valve plate 63 which is adapted to be in slidable face-to-face contact with the upstream surface of a partition 52. Each valve plate 63 is adapted to slidably fit within a slot 54d or 56d, see FIGS. 3 and 5. The plate 63 is held in spaced relation with respect to rod 62 by a pin 64 having one end thereof fixedly secured to rod 62 and the opposite end fixedly secured to plate 63. The size and configuration of plate 63 are such that when the gate valve 61 is in one position of adjustment, the plate 63 will completely cover over the adjacent opening 52a or 52b of the partition, see FIG. 5. To limit the extent to which the plate 63 can move to its open position and to serve as a possible guide bearing therefor, a stop pin 65 is carried on and extends transversely from the upstream surface of the partition 52. There is a stop pin for each opening 52a and 52b. Each stop pin is angularly spaced from the adjacent opening and is adapted to abut a peripheral portion of the plate when the latter assumes an open position.

Because of the viscosity of the fermenting mixture within the tank, the mixture will impart a force onto the gate valve depending upon the direction of rotation of the reel assembly so that the gate valve will automatically assume a closed position when the assembly is rotating in direction A and will automatically assume an open position when the assembly is rotating in direction B. Other types of gate valves may be utilized, if desired, without departing from the scope of the invention.

As seen in FIG. 2, there is disposed within each opening 45 of the tank 41 one or more spray nozzles 66 which are utilized for cleaning in place the tank interior. The nozzles are connected by suitable piping 67 to a source of cleaning fluid, not shown, which is pumped through the piping 67 under high pressure and discharged through the nozzles in the form of a plurality of high pressure jets. Each nozzle may be provided with one or more orifices which are located so that the jets will impinge the tank interior walls and the various components comprising the reel assembly. The techniques and apparatus employed in cleaning-in-place tanks utilized in this type of operation are well-known and, thus, per se such techniques and apparatus are not the subject of the disclosed invention.

Obviously, before the cleaning-in-place operation is commenced, the fermenting mixture is drained or otherwise removed from the tank interior by reversing the direction of rotation of the reel assembly and permitting the mixture to flow out through port 44. Once as much of the mixture as possible has been drained from the tank interior, the pressured cleaning fluid will be sprayed into the tank interior while the reel assembly continues to be rotated in direction B.

The number, size and shape of the nozzles 66 and the relative location thereof, and the procedure to be followed, when cleaning in place, may be varied from that as previously described.

Thus, it will be seen that an improved process has been provided utilizing the first-in/first-out concept which is highly efficient and enables the density of the fermenting mixture to be effectively controlled thereby resulting in a bakery product of high quality being produced. The improved process eliminates the need for numerous large-size hold tanks for the fermenting mixture and yet is readily capable of accommodating various dough formulations. The amount of the finished dough produced by the improved process may be varied to meet various quantity demands. The fermenter utilized in practicing the improved process permits continuous fist-in/first-out flow-through of the fermenting mixture while the latter is undergoing gentle continuous turning over or folding whereby a substantial amount of the gas formed within the fermenting mixture will be readily expelled to the atmosphere. The fermenter is readily capable of being drained of the fermenting mixture, when required, so that the apparatus can be effectively cleaned in place without requiring various changes in piping connections and the like.

I claim:

1. A fermentation apparatus for use in a process of making dough for yeast-raised bakery products, said apparatus comprising a housing provided with an elongated chamber having an annular surface and through which a fermentable mixture is adapted to pass during fermentation thereof, said chamber having a mixture-input port at one end and a mixture- output at the opposite end, means on said housing for venting a portion of the gas produced within the chamber during fermentation of the mixture, and an elongated driven means mounted within said chamber for rotation about the longitudinal axis thereof and effecting continuous inversion of the fermentable mixture; said driven means including a reel assembly having a plurality of longitudinally spaced apertured partitions and imperforate shelf members disposed intermediate and interconnecting adjacent partitions, said partitions and shelf members being rotatable as a unit and cooperating with the chamber surface to form a plurality of interconnected longitudinally arranged compartments through which the fermenting mixture is adapted to successively pass upon rotation of said reel assembly in one direction; the apertures in one partition being offset relative to the apertures in an adjacent partition.

2. The fermentation apparatus of claim 1 wherein said partitions and said shelf members have the outer peripheries thereof disposed closely adjacent the interior surface of said chamber.

3. The fermentation apparatus of claim 2 wherein a first aperture formed in a partition is disposed adjacent the periphery thereof, and a first aperture formed in an adjacent partition is disposed adjacent the axis of rotation of said reel assembly.

4. The fermentation apparatus of claim 3 wherein predetermined partitions are each provided with a second aperture disposed adjacent the periphery thereof and spaced from said first aperture, and a gate valve disposed adjacent said second aperture and adapted to automatically close said second aperture when said reel assembly rotates in one direction and to automatically assume an open position relative to said second aperture when said reel assembly rotates in the opposite direction.

5. The fermentation apparatus of claim 4 wherein each partition adjacent said gate valve is provided with a pair of substantially diametrically opposed second apertures and said gate valve has sections thereof operatively disposed relative to said diametrically opposed apertures.

6. The fermentation apparatus of claim 4 wherein each partition second apertures has a perimetric portion thereof in coplanar relation with a surface of the shelf member connected to said partition and extending upstream therefrom.

7. The fermentation apparatus of claim 1 wherein each successive longitudinally arranged shelf member commencing at one end of the reel assembly is angularly offset relative to the adjacent shelf member, whereby said shelf members are in substantially stepped relation.

8. The fermentation apparatus of claim 7 wherein a portion of the interior surface of said chamber in the vicinity of said output port is provided with means for cooling same to effect cooling of the mixture to a predetermined temperature prior to being discharged through said output port.

9. The fermentation apparatus of claim 1 wherein each shelf member is provided with a pair of planar diametrically opposed sections, and said shelf member sections and said partitions are affixed to a common shaft.

* * * * *

UNITED STATES PATENT OFFICE
CERTIFICATE OF CORRECTION

PATENT NO. : 3,910,177
DATED : October 7, 1975
INVENTOR(S) : Alden H. Wakeman

It is certified that error appears in the above-identified patent and that said Letters Patent are hereby corrected as shown below:

Col. 6, line 18, delete "a" before "shelf"

Col. 8, line 41, "fist-in" should be - first-in

Col. 10, line 6 (claim 6) "apertures"

should be - aperture -

Signed and Sealed this seventeenth Day of February 1976

[SEAL]

Attest:

RUTH C. MASON
Attesting Officer

C. MARSHALL DANN
Commissioner of Patents and Trademarks